United States Patent [19]

Thompson et al.

[11] Patent Number: 5,076,212
[45] Date of Patent: Dec. 31, 1991

[54] POULTRY AGITATION SYSTEM

[76] Inventors: I. Stephen Thompson, P.O. Box 27; Bradley M. Thompson, P.O. Box 93, both of Jerusalem, Ark. 72080

[21] Appl. No.: 591,749

[22] Filed: Oct. 2, 1990

[51] Int. Cl.[5] .......................... A01K 1/00; A01K 39/00
[52] U.S. Cl. .................................... 119/22; 119/51.01
[58] Field of Search ..................... 119/21, 22, 16, 155, 119/902, 29, 51.01

[56] References Cited

U.S. PATENT DOCUMENTS

| | | | |
|---|---|---|---|
| 2,786,448 | 3/1957 | McMaster | 119/902 |
| 3,450,100 | 6/1969 | Cuculic et al. | 119/22 |
| 4,167,153 | 9/1979 | Markum | 119/51.01 |
| 4,304,194 | 12/1981 | Boykin, II et al. | 119/51.04 |
| 4,313,397 | 2/1982 | Markum | 119/51.02 |

Primary Examiner—John G. Weiss
Attorney, Agent, or Firm—Stephen D. Carver

[57] ABSTRACT

An agitator system for stimulating poultry moves birds toward feeding apparatus. The system is designed for easy roof mounting within conventional poultry houses of the type having a plurality of interior, parallel spaced apart lanes. One or more modules comprises individual trolleys which travel in parallel up and down aisles within the house in response to a cable. A frame suspends a track system which supports the trolleys. Each trolley suspend a curtain which rides above the floor of the house. A rigid frame secures an electric drive motor which activates a pulley and cable system for module movement. Each module track comprises an elongated pipe which extends above the isles. Each trolley is suspended on the pipe by wheels riding on the pipe. An alternative track includes a pipe having a lower guide bar. Guide rollers which roll along either side of the guide bar for stabilization. Depending on which side of the cable is tensioned, the trolley will be drawn forward or backward. As one end of the cable is wound about the drive spool, the opposite cable end is unwound from the spool. A rigid yoke extending downwardly from the mounting plate receives the hook portion of an agitator assembly, and a generally rectangular sheet is moved about the aisles. An adjustable shank comprises a pair of telescoping members which can be adjusted to position the curtain at a desired elevation.

11 Claims, 5 Drawing Sheets

FIG. 5
FIG. 6
FIG. 7
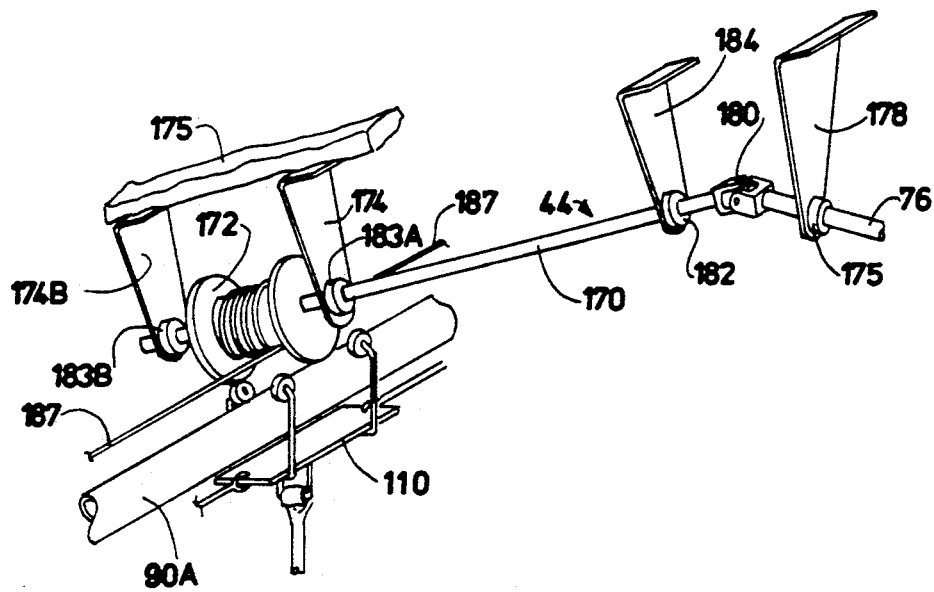
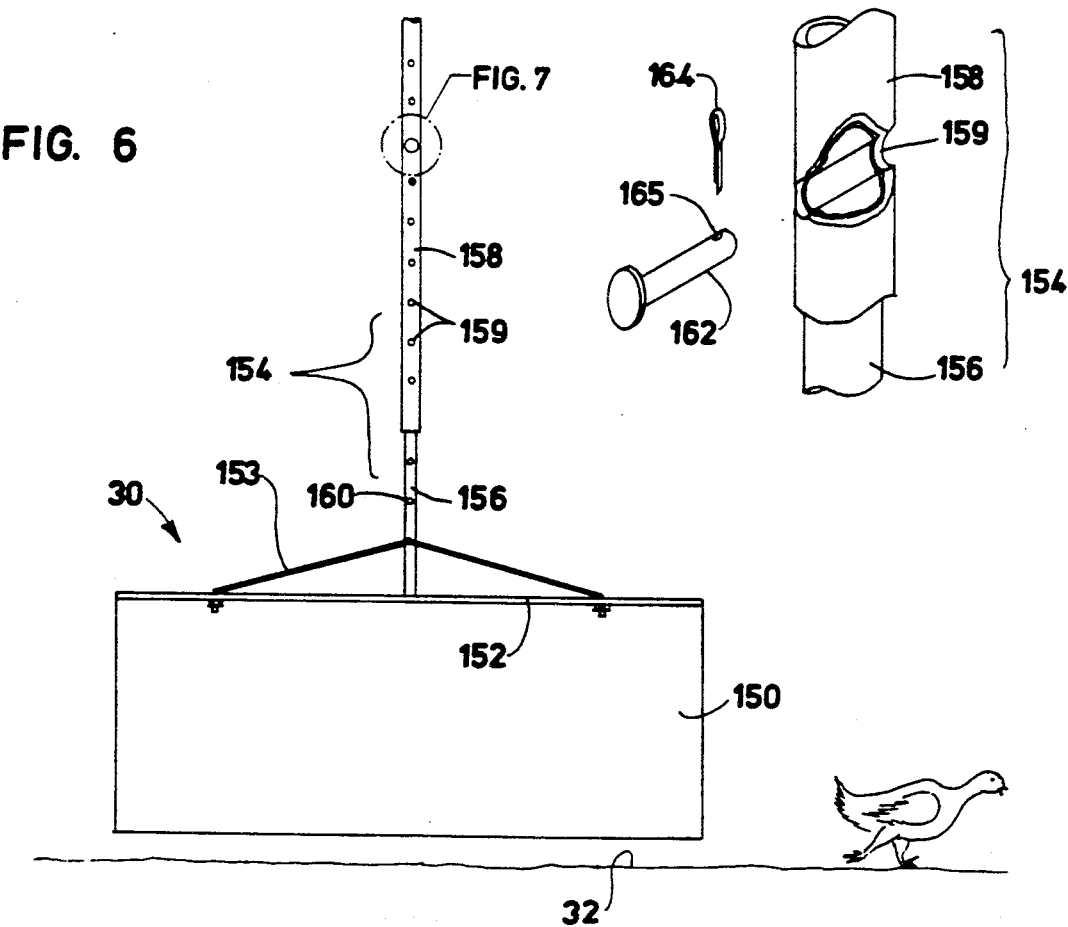

POULTRY AGITATION SYSTEM

BACKGROUND OF THE INVENTION

The present invention relates generally to a system for activating chickens raised in a conventional poultry house. More specifically, the present invention relates to a system for automatically urging chickens to move periodically from the outer periphery of a poultry house toward the aisles, where feed and watering apparatus are provided. The instant system also prevents injury and death to chickens in a poultry house due to overheating.

The modern poultry farmer must focus on producing a large number of marketable chickens in as short a time as possible to realize the maximum realistic profit from a poultry operation. From the time of delivery as chicks, chickens normally remain in the poultry house only six to eight weeks until they reach a marketable "fryer" size and weight, averaging four to five pounds. In order to maintain the rapid gain rate demanded in the industry, the chickens must be continually stimulated to eat and drink in order to achieve a desirable rate of weight gain.

It is important to keep birds moving within the chicken houses towards particular places. For example, many chickens tend to congregate near open aisles along the walls or in the center aisle of the chicken houses. Regular agitation in moving them into specific areas is important to increase their weight gain. The productive areas within a chicken house include the feed and water lanes near the center troughs within the building.

Additionally, for profitable operation, a typical poultry house must generally house between Fifteen Thousand and Twenty Thousand (15,000-20,000) chickens at one time. Because the chickens are continually and tightly crowded together, they are subject to a great risk of injury or death from overheating. Unless the chickens are periodically stimulated to move from their positions of rest, they may rapidly succumb to overheating. The problem is particularly acute in hot weather.

In the prior art known to us, various systems have been proposed for stimulating housed poultry to movement. Markum, U.S. Pat. No. 4,167,153 issued Sept. 11, 1979, teaches a carriage-driven sweeper adapted for use in a chicken pen or similar enclosure. The device comprises a circular overhead track suspended from the ceiling of the pen. A motor-driven carriage suspends an enlarged, flexible baffle. As the carriage travels slowly around the track, the baffle sweeps above the floor and drives the chicken from the center of the pen toward the outer periphery, where the chicken feed is scattered.

U.S. Pat. No. 4,304,194, issued to Boykin on Dec. 8, 1981 teaches the desirability of employing a moving human-simulative mannequin to agitate poultry to movement toward the feeding areas. The mannequin is suspended from a carriage movably mounted to an elongated oval track positioned over the center aisle of the chicken house. The mannequin simulates walking movement and shakes streamers for additional animal stimulation.

A related poultry stimulator device is disclosed in U.S. Pat. No. 4,313,397, issued Feb. 2, 1982 to Markum. The device comprises a track suspended from the ceiling of the enclosure and a plurality of carriages movably mounted on the track. Movement of the carriages along the track is controlled by a docking member. Various devices extend downwardly between the carriages and the chicken house floor. The devices may comprise, for example, a human-simulative body, a hanging feed bucket, a forked prod, or a temperature-sensing probe.

However, neither the above-referenced poultry stimulating devices nor other prior art conveyor systems are well-adapted for use in a modern poultry house. A conventional poultry house is an elongated construction, usually several hundred feet in length, and typically comprises a plurality of adjacent aisles defined between rows of feeding apparatus and water lines. Chickens will attempt to roost virtually anywhere space may be found in the poultry house, including in the aisles, along the side walls, under the feeder structure, and on supporting beams.

For best results, it is desirable to provide relatively constant agitation throughout all open areas of the poultry house. None of the above-referenced track-driven prior art agitator systems provides for constant agitation of the majority of chickens in the house. For example, once the sweep of the above-referenced Markum '153 system has passed a particular area, chickens may immediately return to their roost and remain until the sweep cycles around to the same position again.

Because chickens are extremely excitable, sudden or greatly exaggerated movements are likely to cause the chickens to startle, huddle together in large piles, or even attack one another. On the other hand, it is our experience that chickens quickly become accustomed to continuous, predictable movement in the house, and such movements will eventually be ignored altogether. Moreover, a passing sweep by the prior art systems may not be effective to move the chicken from its place of roost. Thus, it is important that any movements effected by mechanical devices in a poultry house be moderate, properly timed, and carefully controlled to prevent injury to the chickens.

SUMMARY OF THE INVENTION

The present invention relates to an agitator system for exciting animals to movement. The system is well-adapted for use in a poultry house to agitate chickens into movement and direct the chickens generally toward feeding and watering apparatus.

Our system is ideally installed within a poultry house immediately below the underside of the ceiling. It provides one or more modules which travel in parallel up and down aisles within the house. Each module may comprise one or more serially connected agitators. A frame suspends a track system which supports a plurality of movable agitator curtains, which travel over the floor within the poultry house. Each curtain is associated with individual movable trolley modules, and the modules are driven concurrently by a drive shaft system.

The frame preferably comprises a pair of inverted, generally V-shaped suspension members whose legs are fastened to the underside of the house roof. The frame members support suitable pillow blocks for the drive shaft system and a mounting plate upon which an electric drive motor is fastened. The motor revolves a pulley system linked to the drive shaft splined to suitable cable spools which activate elongated cables for moving the trolleys.

Each module track preferably comprises an elongated pipe made of tubing which extends the full length of the house above the aisles. Three modules are preferred, and the modules are interconnected by a drive shaft system. In the best mode each module includes a trolley system comprising a rigid, generally planar support plate suspended beneath the pipe by a pair of parallel and spaced apart generally C-shaped axles. Each trolley axle comprises a pair of integral, vertically upwardly extending legs surrounding the pipe, which supports load bearing wheels. Cable ends are attached at opposite ends of each plate. Depending on which side of the cable is tensioned, the trolley will be drawn forward or backward. As one end of the cable is wound about the drive spool, the opposite cable end is unwound from the spool.

A rigid yoke extending downwardly from the mounting plate receives the hook portion of an agitator curtain assembly. Each curtain assembly comprises a generally rectangular sheet of plastic or rubber which is moved about the aisles. An adjustable curtain shank comprises a pair of telescoping members which can be adjusted to position the curtain at a desired elevation.

An alternative track includes a pipe having a lower guide bar. Guide rollers which roll along either side of the guide bar as the trolley is moved. Enhanced stabilization occurs in cooperation with the upper wheels which support the weight of the trolley, and ride upon the top of guide track pipe.

The preferred electrical control circuit facilitates curtain travel reversal and timing of the travel cycles.

Thus it is a fundamental object of the present invention to provide a system for stimulating animals, particularly poultry.

A basic object of our invention is to move poultry from unproductive areas within chicken houses, such as the center aisle and open aisle along the walls, into the productive areas within the house, such as the feed and water lanes.

Another basic object of the present invention is to provide a system for periodically encouraging animals such as poultry to move toward feeding or watering apparatus.

A similar fundamental object of the present invention is to provide a system for exciting chickens to move to prevent injury and death from overheating.

A related object of the present invention is to provide a system for periodically agitating chickens in a poultry house to move toward feeding and watering devices.

Another object of the present invention is to provide a mechanical animal agitator system which may be periodically activated to excite animals to move within an enclosure.

A further object of our invention is to provide an animal agitator system which periodically creates movement in various distinct areas of a poultry house.

Still another object of the present invention is to provide a poultry agitator system which periodically moves in a manner which does not startle the chickens.

Yet another object of the present invention is to provide a mechanical animal agitator system which may be readily adapted for use in various types and sizes of animal enclosures.

Another object of the present invention is to provide a mechanical animal agitator system comprising various modules which may be independently mounted and operated within an animal enclosure.

A related object of the present invention is to provide an automatic poultry agitator system which provides relatively constant rotation of the chickens.

A further object of the present invention is to provide an automatic poultry agitator system having improved stabilizing means.

Another important object is to prevent damage or harm to the birds. It is important to move chickens, and not to scare them.

A similar object of the present invention is to provide a constant rotation of birds within the house.

Another related object of the present invention is to provide agitation to chickens to stimulate them to eat and drink, causing them to move into dormant zones until the next run cycle begins.

Still another object of the present invention is to provide an automatic poultry agitator system which moves in alternate directions.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a fragmentary, left side perspective view of a portion of an outer drive assembly taken generally from Region 5 indicated in broken lines in FIG. 2;

FIG. 6 is a fragmentary, elevational view illustrating a preferred agitator curtain;

FIG. 7 is an enlarged, fragmentary, side perspective view illustrating the sweeper shank, taken generally from Region 7 indicated in broken lines in FIG. 6;

DETAILED DESCRIPTION

Figure 1:
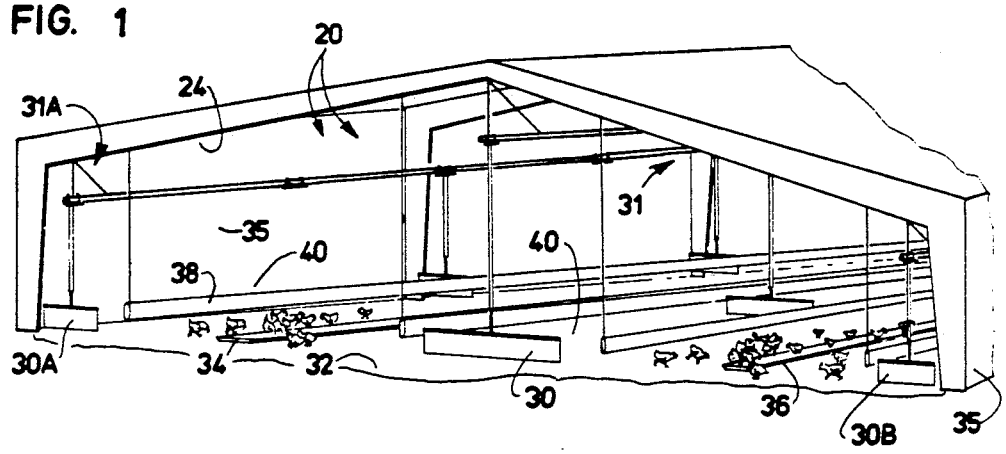
FIG. 1 is a fragmentary, interior pictorial view of a conventional poultry house illustrating the best mode of our agitator system.
Figure 2:
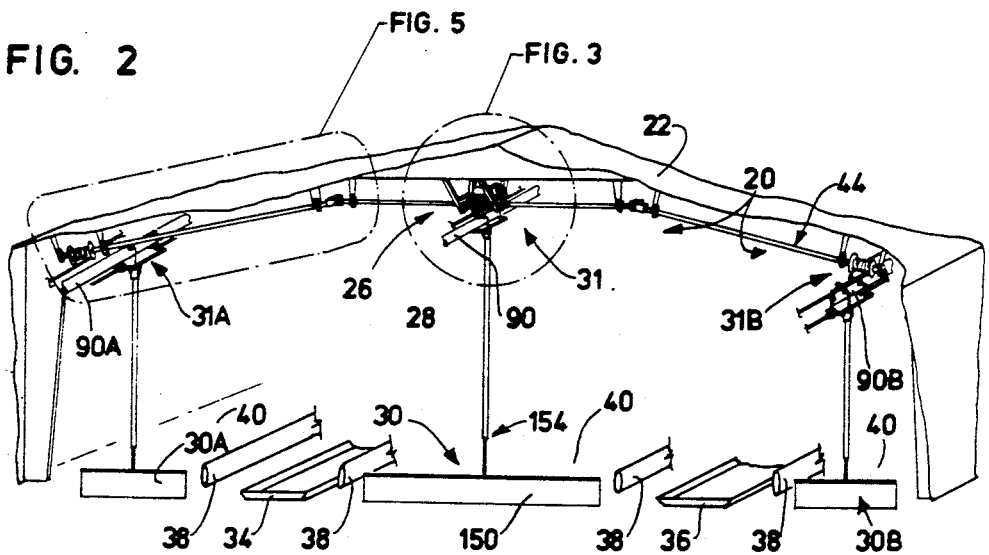
FIG. 2 is a fragmentary, pictorial view thereof, in which portions are omitted or broken away for clarity.
Figure 3:
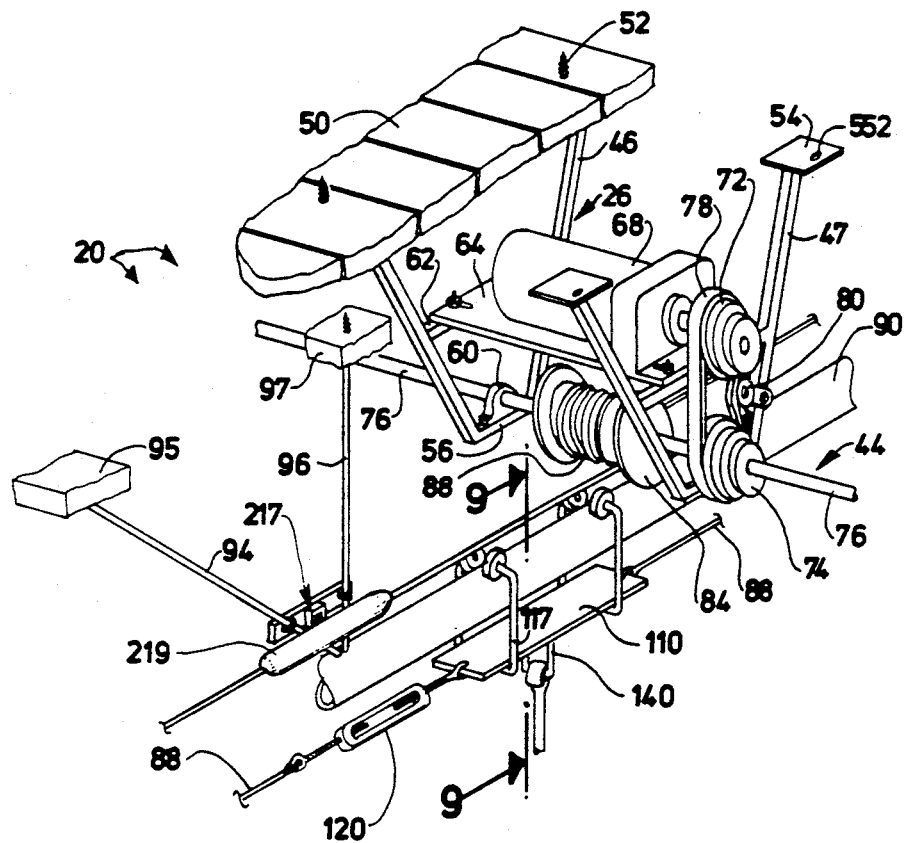
FIG. 3 is an enlarged, fragmentary, side perspective view of a portion of the preferred frame and cable drive assembly taken generally from Region 3 indicated in broken lines in FIG. 2.

With initial reference now directed to FIGS. 1-3 of the appended drawings, a system for agitating chickens to stimulate activity, feeding and growth has been generally designated by the reference numeral 20. Ideally system 20 is installed within a conventional chicken house 22 immediately below the underside of the ceiling 24. System 24 provides one or more modules which travel in parallel up and down aisles within the house. Each module may comprise one or more serially connected agitators, as will hereinafter be explained in detail.

System 20 comprises a frame 26 secured to the underside of the roof, which suspends a track system generally designated by the reference numeral 28. A plurality of agitator curtains 30 are suspended from the system, and move over the ground 32 within the house. Each of the curtains 30, 30A and 30B are associated with individual movable trolley modules 31, 31A, and 31B which are driven simultaneously and interconnected by a drive shaft system 44 (FIG. 2) to be described in more detail hereinafter.

As seen in FIG. 1, a typical chicken house includes a plurality of elongated feeders 34, 36 which are spaced apart and oriented generally parallel within the house. Elongated water troughs 38 are disposed in parallel relation to the feeders. Thus relatively unobstructed lanes 40 exist between the parallel troughs 38 and feeders 34, and between the outermost water troughs and the side walls 35 of the house. As best seen in FIG. 2, the curtains 30, 30A, and 30B, are normally disposed within the various lanes 40 between the troughs 34 and water feeders 38.

With primary attention now directed to FIGS. 3-5 and 8 and 9, frame 26 comprises a pair of inverted, generally V-shaped suspension frame members 46 and 47 whose legs are fastened to the underside of the house roof 50 with suitable fasteners 52. Each of the frame legs includes suitable mounting plates 54, the orifice 55 in which is penetrated by fasteners 52. The horizontal member 56 of the frame members supports suitable pillow blocks 60 which support the drive shaft system 44 to be later described. An intermediate cross piece 62 of the frame members supports a mounting plate 64 upon which an electric gear drive motor 68 is fastened. Preferably motor 68 is a one half horsepower, heavy duty gear motor which delivers at least 700 pounds of torque at twelve RPM's. It is enclosed for use in dusty applications.

Gear motor 68 drives a pulley 72 spaced above a lower pulley 74 linked to shaft 76 (which comprises a portion of drive shaft system 44). A conventional V-Belt 78 couples pulley 72 and 74 together. A slack tensioner 80 is mounted to one leg of the frame support member. When gear motor 68 operates, shaft 76 is rotated. A spool 84 splined to shafts 76 is disposed beneath motor 68, between the frame support members 46, 47. It activates an elongated cable 88 entrained about it, for moving the trolleys as herein after described.

The track means 28 preferably comprises an elongated circular pipe 90. Each track consists of two inch galvanized tubing which extends the full length of the house and is supported from the ceiling at ten foot intervals. Since three modules are preferred (as seen in FIG. 2) separate spaced apart and parallel elongated pipes 90, 90A and 90B are employed for the three tracks shown in FIG. 2. Pipe 90 is suspended from the roof of the enclosure at various intervals by struts 94 and 96 (FIG. 3) which extend to the ceiling portions 95, 97. Intermediate rods 100, brace rod 101 (FIG. 8) and 103 (FIG. 9) are employed. Rod 101 extends at an angle of 45 degree to the pipe 90 from the ceiling in order to brace the pipe. It is preferred that each of the rods are threadably coupled to the pipe 90 and extend through the pipe interior, being fastened by conventional nuts 106. As best viewed in FIG. 9, these rod 103 penetrates the pipe 90 and bisects it into two separate halves, so that they are centered at the top of the pipe when they enter. This leaves clearance room for the trolley load wheels to be hereinafter described.

Figure 9:
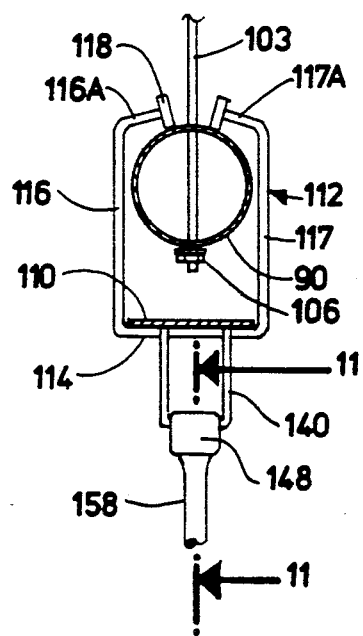
FIG. 9 is an enlarged, fragmentary, front sectional view taken generally along line 9—9 of FIG. 3.

In the best mode each trolley system comprises a rigid, generally planar support plate 110 which is oriented below and generally parallel with the pipe 90. The support plate is suspended beneath pipe 90 by a pair of parallel and spaced apart generally C-shaped trolley axles 112. Each axle 112 comprises a lower horizontal portion 114 welded to the underside of the plate 110, and a pair of integral, spaced apart vertically upwardly extending legs 116 and 117 which surround the pipe (FIG. 9). As best seen in FIG. 3, each trolley comprises two trolley axles 112 spaced apart along the length of plate 110. Each vertical axle portion 116, 117 terminate in an interned portion 116A, 117A which supports suitable load wheels 118 or 118A positioned to roll along the top of the pipe 90. As best seen in FIG. 9, these load wheels 118 will be disposed on opposite sides of the brace rod 103 for clearance. As seen in FIG. 3, one end of cable 88 is attached at a first end of each plate 110, and the opposite end of the cable is attached to a suitable turn buckle 120 which must be tensioned properly during installation. Depending on which side of the cable is tensioned, the trolley will be drawn toward or away from the viewer (i.e. as viewed in FIG. 9) as the cable pulls the plate 110.

Figure 8:
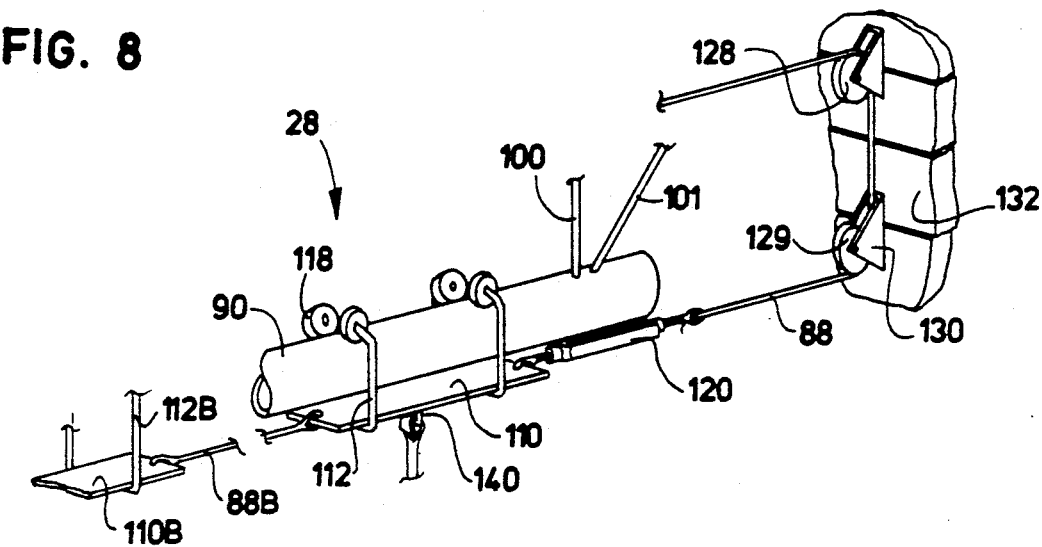
FIG. 8 is a fragmentary, side perspective view illustrating the mounting of the drive assembly to the poultry house wall.

As one end of the cable is wound about spool 84, the opposite end is concurrently unwound from the spool. The deployed cable extends the full length of the track, above it and below it. The cable is terminated at a pair of spaced apart pulleys 128, 129, mounted through brackets 130 to a suitable structural piece 132 (FIG. 8). As best viewed in FIG. 8, each module may comprise serially connected trolleys, and a portion of a trolley plate 110B is illustrated. Cable segment 88B can interconnect the two serial connected trolleys so that more than one trolley can be moved about the house on the same track.

A rigid yoke 140 extends downwardly from the mounting plate 110. This yoke receives the terminal hook portion 148 of the agitator curtain assembly 30. As best seen in FIGS. 6 and 7, the curtain assembly comprises a generally rectangular sheet of plastic or rubber 150 braced by an elongated top rail 152. The shank 154 of the curtain assembly comprises a pair of telescoping members 156 and 158 each of which include a plurality of orifices 159, or 160 which, when vertically adjusted as in FIG. 6, may be fastened as in FIG. 7. The curtains are positioned above the lower surface 32 (FIG. 6) such that adequate clearance is obtained. As best seen in FIG. 7, suitable fastening pins 162 are inserted through the aligned orifices 160, 159 and thereafter locked into position by suitable cotter pins 164 which penetrate pin orifices 165. Since the hook like end of the member 158 is loosely hooked over the yoke 140, some side to side movement will be inevitable. An optional pair of stabilizers 153 may be interposed between members 156 and the rail 152. It will also be appreciated that curtains 30A and 30B may be some what smaller than the main curtain 30, and the width is suited such that they adequately clear the spaces between alternate feed troughs or water troughs.

The additional modules such as modules 31A and 31B do not include the drive motor. As best seen in FIG. 5 they are driven by axle system 44, which comprises remote shaft portions such as portion 170 which drives remote cable spool 172. Spool 172 may be mounted somewhat at an angle between suitable braces 174 extending from a roof frame portion 175. Drive axle 76 is received through a suitable bearing 175 within a mounting bracket 178 and couples to a universal joint 180 to which the end of shaft 170 is coupled. One end of shaft 170 penetrates a suitable bearing 182, which is mounted on bracket 184, and the opposite end penetrates bearings 183A and 183B respectively defined in brackets 174 and 174B (FIG. 5), and spool 172. Thus when spool 172 is rotated in response to rotation of shaft 170, remote cable 187 will be activated to move the remote module.

Figure 4:
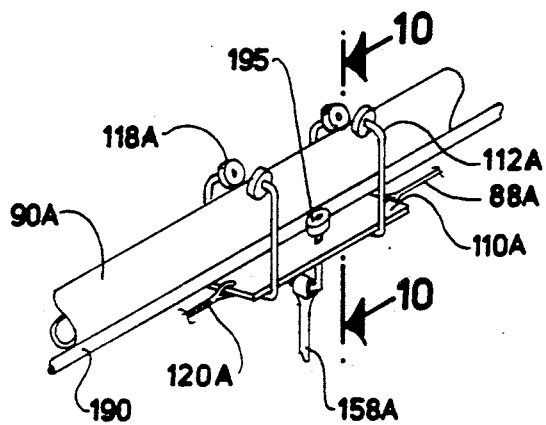
FIG. 4 is a fragmentary, perspective view of an alternative embodiment of the trolley mechanism.
Figure 10:
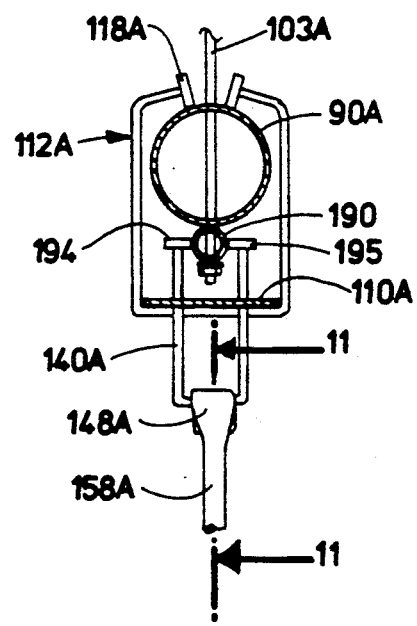
FIG. 10 is an enlarged, fragmentary, rear sectional view taken generally along line 10—10 of FIG. 4.
Figure 11:
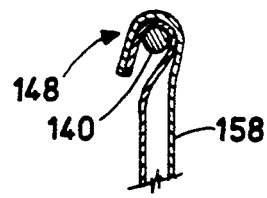
FIG. 11 is an enlarged, fragmentary, sectional view taken generally along line 11—11 of FIG. 9; and, FIG. 12 is an electrical schematic diagram of the preferred controller circuit.

Turning now to FIGS. 4 and 10, an alternative arrangement is discussed. Wherever possible the reference numerals in FIGS. 4 and 10 have been assigned the suffix A to differentiate them from similar like numbered parts discussed previously. As seen in FIG. 10, pipe 90A includes a lower circular guide bar 190, which is coextensive with its length. Guide bar 190 is also penetrated by the brace rod 103A. The lower yoke 140A penetrates the support plate 110A and terminates in guide rollers 194 and 195 which roll along either side of the guide bar 190 as the trolley is moved. Enhanced stabilization occurs in cooperation with the upper wheels 118A which support the weight of the trolley, and ride upon the top of track pipe 90A. As with the first embodiment, more than one trolley may be coupled serially, and thus the interconnection seen in FIG. 8 involving plate 110B would be employed with embodiment of FIG. 10. Also, the curtain will be suspended through the same shank 154 as previously described.

Figure 12:
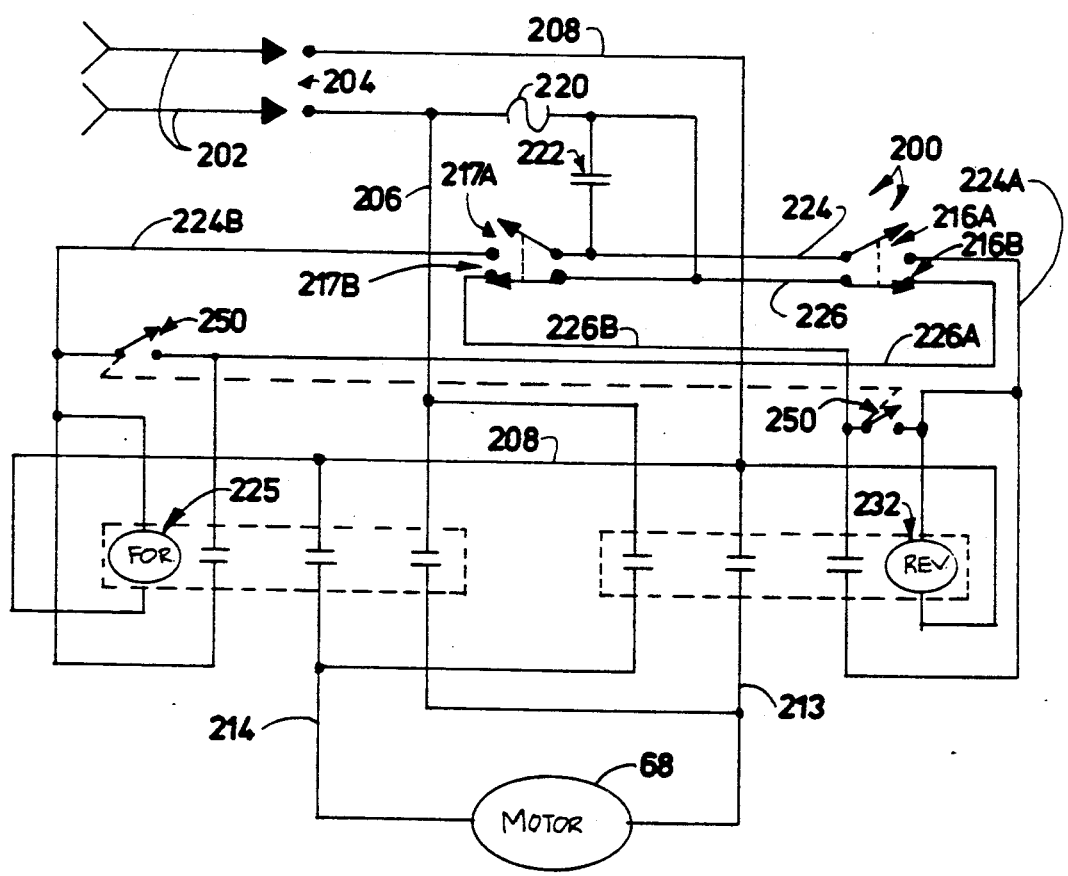

With reference to FIG. 12, the preferred electrical control circuit is generally designated by the reference numeral 200. +Incoming voltage across lines 202 is applied through a double pole, single throw current limiting breaker switch 204 which transmits voltage across buss lines 206, 208. Lines 206 and 208 supply the power to motor 68 via the reverse and forward relays 232 and 225. They also supply power to the coil circuit 226 through a fuse 220.

The direction of motion of motor 68 is dependent upon the state of the reverse relay 232 or forward relay 225. The reverse relay 232 is energized by the momentary closure of normally -open timer contact 222 via the normally-open contact in the forward limit switch 216A/216B. The reverse relay 232 remains energized through a normally open holding contact in relay 232 and the normally closed contact 217B in the reverse limit switch. The reverse relay is deenergized by the opening of the normally closed contact in the reverse limit switch 217. The reverse limit switch 217 (FIG. 3) is activated by a cam-mechanism 219 (FIG. 3) mounted on the trolley cable. Activation of switches 217A, 217B allows the forward relay 225 to become energized upon the next momentary closure of normally open timer contact 222 at the end of the next time interval via the normally closed contact reverse limit switch 217B. The forward relay 225 is then held energized through a normally open holding contact in relay 225 via the normally closed contact 216B. The forward relay 225 will deenergized upon the opening of the normally closed contact in the forward limit switch 216.

The forward limit switch 216 is activated by a second cam mechanism mounted on the trolley cable. The activation of the forward limit switch 216 allows the reverse relay 232 to become energized upon the next momentary closure of the normally open timer contact 222 at completion of the next time interval through the normally closed contact in the forward limit switch 216. Limit switch 216 and its corresponding cam-mechanism are positioned on the opposite side of spool 84 (FIG. 3) and similar to limit switch 217 and cam mechanism 219 in relation to the distance of movement desired.

The system may be manually operated in either the forward or reverse direction by the double pole-triple throw momentary contact 250.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A poultry agitator system for mounting within a poultry house having a floor and a ceiling, said system comprising:
    a rigid, elongated track forming a substantially straight path;
    mounting means for securing said track beneath said ceiling;
    a movable trolley suspended from said track, the trolley comprising a rigid support plate, axle means projecting upwardly from said support plate and terminating in spaced apart load wheels for riding on said track and clearing said mounting means;
    continuous cable means for activating said trolley;
    drive pulley means for pulling said cable means to displace said trolley;
    curtain means suspended from said trolley and projecting toward said floor for stimulating animals below;
    motor means for activating said drive pulley means to move said trolley along the track; and,
    electrical circuit means for timing and controlling said motor means.

2. The system as defined in claim 1 further comprising a yoke associated with each support plate and a load bearing shank projecting downwardly from said yoke for pivotally supporting said curtain means.

3. The system as defined in claim 2 wherein said cable means comprises a pair of segments each terminating at said drive pulley means and at said support plate.

4. The system as defined in claim 1 wherein said track means comprises guide means for stabilizing said trolleys during movement along said track, and said trolley comprises roller wheels for riding on said guide bar means for stabilizing said trolleys.

5. An animal agitator system adapted to be mounted within an animal enclosure having a floor and a ceiling, said system comprising:
    a plurality of generally parallel modules suspended for movement within said enclosure at spaced apart locations therewithin, each of said modules comprising:
    an elongated track forming a substantially straight path;
    mounting means for securing said track beneath said ceiling;
    a movable trolley suspended from said track, the trolley comprising a rigid support plate, axle means projecting upwardly from said support plate and terminating in spaced apart load wheels riding on said track and clearing said mounting means;

continuous cable means for activating said trolley;

drive pulley means for pulling said cable means to displace said trolley; and, curtain means suspended from said trolley and projecting toward said floor for stimulating animals below; and, drive means for operatively interconnecting each of the modules for driving the trolleys in a desired direction along the track.

6. The system as defined in claim 5 further comprising a yoke associated with each support plate and a load bearing shank projecting downwardly from said yoke for pivotally supporting said curtain means from said trolley.

7. The system as defined in claim 6 wherein said cable means comprises a pair of segments each terminating at said drive pulley means and at said support plate.

8. The system as defined in claim 5 wherein said track comprises guide means for stabilizing said trolleys during movement along said pipe, said guide means comprising lower guide bar means extending beneath said track, said trolley comprising stabilizing wheels for riding on said guide bar means.

9. An animal agitator system adapted to be mounted within an animal enclosure having a floor and a ceiling, said system comprising:

a plurality of modules suspended for movement within said enclosure at spaced apart locations therewithin, each of said modules comprising:

a support track comprising a rigid, elongated pipe;

suspension rod means for supporting said track beneath said ceiling;

a movable trolley suspended from said track, the trolley comprising a rigid support plate, generally C-shaped axle means projecting upwardly from said support plate and terminating in spaced apart load wheels riding on said pipe and clearing said suspension rod means;

continuous cable means for activating said trolley, said cable means comprising segments terminating at said support plate;

drive pulley means for pulling said cable means to displace said trolley; and, curtain means for stimulating animals;

drive means for operatively interconnecting each of the modules for driving the trolleys in a desired direction along the track; and, electrical circuit means for timing and controlling said drive means.

10. The system as defined in claim 9 wherein said support plate comprises a downwardly projecting yoke and said curtain means comprises a load bearing shank pivoted to said yoke, said shank comprising a pair of adjustable telescoping members for varying the length of the shank.

11. The system as defined in claim 9 wherein said track means comprises guide means for stabilizing said trolleys during movement along said track, and said trolley comprises roller wheels for riding on said guide bar means for stabilizing said trolleys.

* * * * *